June 18, 1940.  F. H. GULLIKSEN  2,205,254
REGULATOR
Filed Nov. 27, 1937  2 Sheets-Sheet 1

WITNESSES:
C. J. Weller.
F. E. Hardy

INVENTOR
Finn H. Gulliksen.
BY
Ezra W. Savage
ATTORNEY

June 18, 1940.  F. H. GULLIKSEN  2,205,254
REGULATOR
Filed Nov. 27, 1937  2 Sheets-Sheet 2
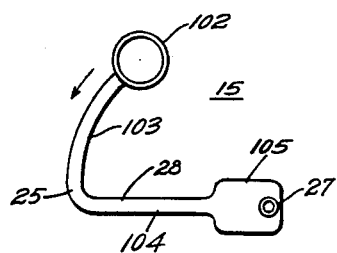
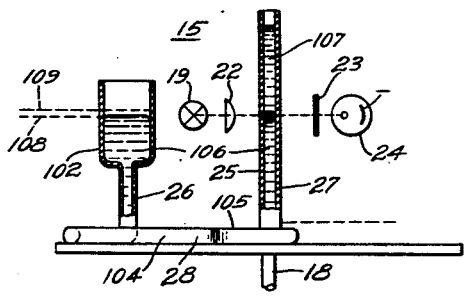
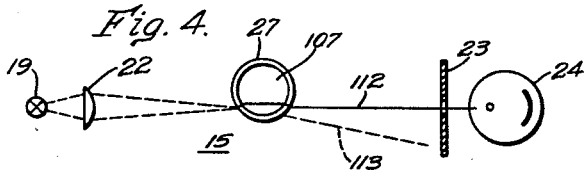
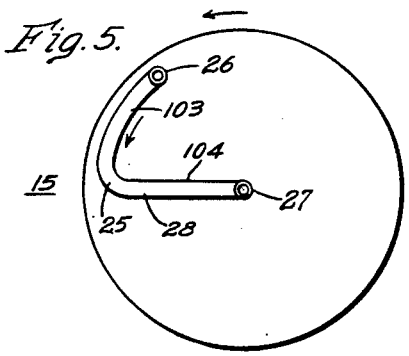
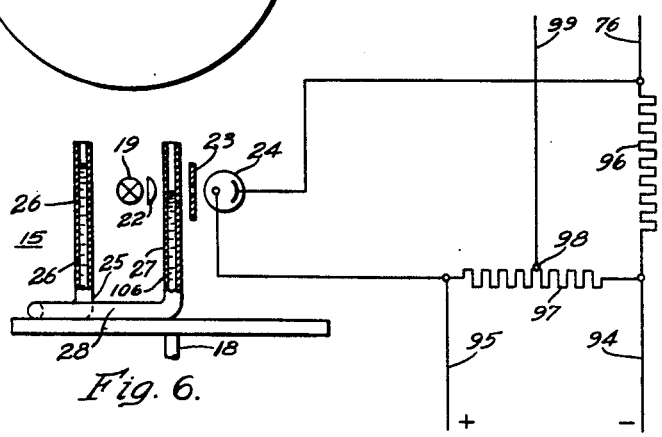
INVENTOR
Finn H. Gulliksen.
BY
ATTORNEY Patented June 18, 1940

2,205,254

UNITED STATES PATENT OFFICE 2,205,254

REGULATOR

Finn H. Gulliksen, Wilkinsburg, Pa., assignor to Westinghouse Electric & Manufacturing Company, East Pittsburgh, Pa., a corporation of Pennsylvania Application November 27, 1937, Serial No. 176,864

9 Claims. (Cl. 250—41.5)

My invention relates to electronic regulators and particularly to indicating means adapted to initiate the control of regulators for governing a regulated quantity, such as the voltage of a generator, or the speed of a motor in response to a variation from its desired value.

In practicing my invention, I make use of a centrifugal device that is actuated in accordance with the value of the regulated quantity and which controls a phototube in accordance with variations in the regulated quantity as determined in variations in the speed of the centrifugal device from a critical value.

One object of my invention is the provision of an electronic regulator that is reliable and accurate in operation and that is quick and positive in response to changes in the regulated quantity from the desired value.

Another object of my invention is the provision of an electronic regulator or indicator that possesses a high degree of sensitivity at the chosen value of the regulated quantity.

Further objects and advantages of my invention will be apparent from the following description of one preferred embodiment thereof, reference being had to the accompanying drawings, in which:

Figs. 2 and 3 are plan and side elevational views, respectively, of a portion of the speed responsive device employed in the regulator system in Fig. 1;

Fig. 4 is a diagrammatic view illustrating the principle of control of the phototube employed in the regulator system in Fig. 1;

Fig. 5 is a plan view of a modified control to be employed in the speed responsive device; and Fig. 6 is an elevational view of the control tube shown in Fig. 5, together with a schematic illustration of the phototube controlling circuit connections.

Figure 1:
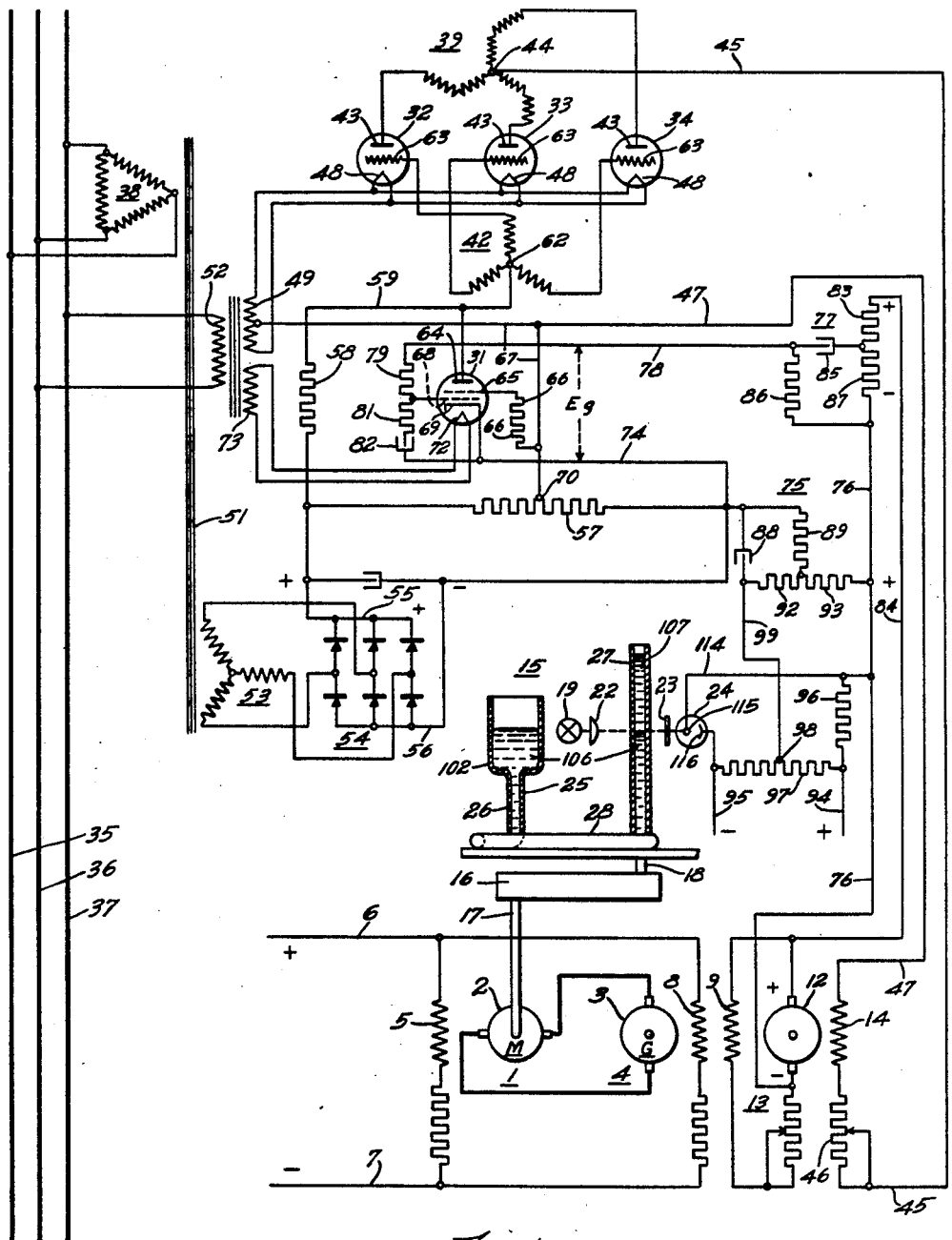
Figure 1 is a schematic diagram of circuits and apparatus constituting one preferred embodiment of the invention.

Referring to Figure 1 of the drawings, a regulated motor 1 is illustrated provided with an armature winding 2 that is connected to the armature winding 3 of an associated generator 4 for supplying energy thereto, the motor having a field winding 5 connected to a suitable source of direct-current energy, such as the conductors 6 and 7. The generator 4 is illustrated as being provided with a field winding 8 that is supplied with energy from the conductors 6 and 7 and a field winding 9 that is connected to the armature 12 of an exciter generator 13, that is provided with a field winding 14, the energization of which determines the output of the exciter generator 13 and consequently, of the main generator 4 to control the energy supplied to the motor 1.

A speed responsive device indicated generally at 15 is provided that is connected through a speed-changing mechanism 16 to vary the ratio between the motor-driven shaft 17 and a shaft 18 driving the speed responsive device, in order to adjust the speed responsive device to so control the motor 1 as to maintain a desired rate of speed. The speed responsive device 15 comprises a source of illumination 19, from which a beam of light is focused by a lens 22 through a glass tube section 21, an aperture in a diaphragm 23 upon a phototube 24 as controlled by fluid in the U-shaped tube 25 of the speed responsive mechanism. The tube 25 consists in its elementary form of two vertical tube sections 26 and 27 respectively, connected by an intermediate section 28, and so mounted as to be revolved substantially about the axis of one of the vertical tube sections 27, so that centrifugal force acting upon the liquid within the tube 25 will cause an increasing volume of the liquid to flow toward the outer leg 26 of the U-shaped tube as the speed of the device increases, thus lowering the level of the liquid in the tube section 27. The illumination of the phototube 24 from the source 19 is controlled by the level of the liquid in the central leg 27 of the U-shaped tube.

The phototube 24 controls the grid potential of a control tube 31 which in turn controls the grid potential of rectifying tubes 32, 33 and 34, in a manner to be later described, for controlling the energy supplied to the field winding 14 of the exciter generator 13.

A suitable alternating-current source, represented by conductors 35, 36 and 37, is provided for supplying three-phase energy to a transformer winding 38 shown connected in delta and inductively coupled to transformer secondary windings 39 and 42. The windings 39 constitute an anode transformer having the several phase winding portions connected in double Y relationship, the outer terminals being connected to the anodes 43 of the respective rectifying tubes 32, 33 and 34, and the neutral point 44 being connected by conductor 45 through a rheostat 46 to one terminal of the exciter field winding 14. The other side of the field winding 14 is connected by conductor 47 to the cathodes 48 of the rectifier tubes through the secondary winding 49 of a grid transformer having a primary winding 52 shown connected to alternating-current conductors 37 and 36. The windings 42 are Y connected to provide an alternating-current ripple in the grid circuit of the rectifier tubes that is approximately 90° displaced from the anode voltage.

A control transformer is provided, having secondary windings 53 that are inductively related through core 51 to primary windings 38, and is employed for supplying power to a full-wave rectifier 54 which provides a unidirectional voltage at the terminals 55 and 56 that is applied across a resistor 57 for a purpose to be later explained.

The grid circuit of the rectifier tubes 32, 33 and 34 extends from the cathodes 48, through transformer winding 49, conductor 67 to junction point 70, the left portion of resistor 57 to the positive terminal 55 of the rectifier 54 through resistor 58 and conductor 59 to junction point 62 of the ripple transformer 42, through the several individual branch circuits of the three-phase transformer winding to the three grids 63 associated with the several tubes 32, 33 and 34. The control tube 31 governs the potentials of the grids 63 by controlling the flow of current from the positive terminal of the resistor 57 through resistor 58 to the negative terminal of the resistor 57, thus varying the voltage drop across resistor 58.

The control tube 31 comprises an anode 64 connected to conductor 59, an anode grid 65 connected through a resistor 66, and conductor 67 to the grid transformer 49 and to an intermediate point 70 on the resistor 57. The tube further includes a control grid 68, a cathode 69, and a cathode heater 72 that is connected to a secondary winding 73 inductively related to the grid transformer primary winding 52.

The grid control circuit of the control tube 31 extends from the cathode 69 through conductor 74, a quick response network 75, conductor 76, an anti-hunting network 77, conductor 78 and grid resistor 79 to the control grid 68. The control grid 68 is also connected through a resistor 81 and capacitor 82 to the cathode 69 to by-pass alternating-current ripples.

The anti-hunting network 77 includes a resistor 83, the terminals of which are connected by conductors 76 and 84, respectively, to the terminals of the exciter armature winding 12. A condenser 85 is connected to an intermediate point of the resistor 83 in parallel circuit relation to a resistor 86 and the lower portion 87 of the resistor 83, to modify the grid potential in a manner to be later explained.

The quick response network 75 includes a condenser 88 connected in series with a resistor section 92 in parallel circuit relation with a resistor 89. A resistor section 93 is also provided that is connected between the junction of sections 92 and 89 and conductor 76. The resistor sections 92 and 93 in series comprise a resistor to which a unidirectional voltage is applied from a source indicated by conductors 94 and 95 as controlled by the phototube 24. A resistor 96 is provided between the positive conductor 94 and conductor 76, and a resistor 97 is provided between the source terminal conductors 94 and 95, to an intermediate point 98 of which a conductor 99 connects the left-hand terminal of resistor section 92, thus connecting the resistor sections 92 and 93 between junction point 98 and conductor 76.

The details of construction of the speed responsive device will be better understood by reference to Figs. 2 and 3, in which the revolving tube 25 is illustrated as provided with an outer enlarged cup portion 102 connected through an intermediate section 28 having a portion 103 that is arranged substantially circumferentially with respect to the axis of rotation, and a portion 104 that extends substantially radially from the axis of rotation, and provided at its inner end with an enlarged volume 105 just below the upwardly extending section 27. A liquid of high specific gravity, such as mercury, indicated at 106, is provided in the lower connected portions of the tube, above which a liquid of lower specific gravity, such as alcohol or water, indicated at 107, is provided in the inner or axially located leg of the device.

Neglecting the weight of the liquid 107, the heavy liquid 106 will seek its level in the two tubes 26 and 27 when the device is at rest, and will rise in the outer tube 26 due to centrifugal force as the speed of revolution about the axis of the leg 27 increases. The provision of a cup or an enlarged portion 102 of larger diameter than the inner tube permits a relatively large quantity flow of the heavy liquid from the tube 27 to the tube 26 with a comparatively slight increase in the level of the liquid in the cup 102 as indicated by the lines 108 and 109. This permits a greater change in the level of the liquid in the tube 27 for a given change in speed before the centrifugal force is balanced by the force of gravity than would take place if the liquid rose in the outer leg 26 an amount corresponding to its drop in the inner leg 27, thus increasing the sensitivity of the device. The provision of the enlarged area 105 at the junction of the vertical tube portion 27 with the horizontal tube portion 104 further increases the sensitivity of the device by maintaining the radial portion of the tube 104 substantially filled with the heavier liquid. That is to say, as the liquid 107 moves downwardly through the tube 27 until a small portion of it enters the enlarged chamber 105, this lighter weight liquid will extend only a very small distance circumferentially from the axis of rotation outwardly within the tube 104, because a relatively large movement of the level of the liquid in the tube 27 is required to introduce an appreciable volume in the chamber 105. Consequently, the liquid acted upon by the centrifugal force of rotation in the chamber 105 and in tube section 104 is at all times substantially the heavier liquid 106 alone.

Fig. 4 illustrates the refractive action of the liquid 107 in the upper portion of the tube 27, through which the light beam is focused by the lens 22. For the purpose of simplifying and understanding this phenomena, the tube 27 is shown somewhat enlarged. The light beam from the source 19 is focused by the lens 22 to hit the glass tube 27 at one side of its center, and the beam will be refracted along the line 112 when the liquid 107 is in the portion of the tube 27 traversed by the light beam, thus making the tube 24 more conductive. When the level of the liquid 107 drops in the tube 27 below the level at which the light beam intersects the tube, so that the central portion of the tube contains air instead of water or alcohol, the light beam will be refracted in the direction indicated by the dotted line 113 so that this light beam will not sensitize the phototube 24, which will then be less conductive.

The operation of the system is as follows. When the motor 1 is operating at its desired speed, the centrifugal force acting on the liquid in the tube 26 of the speed responsive device 15 is such that the surface level of the liquid 107 is substantially in the plane of the light beam from the source 19 to the tube 24. As the motor speed decreases slightly below its desired speed, the centrifugal force will correspondingly decrease and permit the force of gravity acting on the liquid to raise the level of the liquid 107 slightly, swinging the light beam to position 112 in Fig. 4 and making the tube 24 more conducting, while as the speed increases slightly above the desired speed, the liquid 107 will lower slightly below the plane of the light beam by the increasing centrifugal force, changing the beam to the position 113 in Fig. 4 to make the phototube 24 less conducting.

When, for example, the motor speed decreases slightly below its desired value, causing the conductivity of the phototube 24 to increase, the flow of current from the positive conductor 94 through resistor 96, conductor 114, the positive terminal 115 and negative terminal 116 of tube 24 and to conductor 95, will increase the voltage drop across resistor 96 and consequently, decrease the voltage across the resistor 93 in the grid circuit of the control tube 31, making the potential of the grid 68 more negative.

As the control grid 68 becomes more negative, the current through the tube 31 between the anode 64 to the cathode 69 decreases, thus decreasing the flow of current from the positive terminal 55 of the full-wave rectifier through resistor 58 and tube 31, to the negative terminal 56, which decreases the voltage drop across the resistor 58. This decrease in voltage drop across resistor 58 causes the grids 63 of the rectifier tubes 32, 33 and 34 to become more positive, thus increasing the flow of current through the rectifier tubes to correspondingly increase the excitation of the exciter generator 13 and of the main generator 4, to increase the speed of the motor 1.

When the voltage between conductors 76 and 99 is changed in either direction, a current flows to or from the condenser 88 as a result of the changing potential across its terminals in the local circuit of resistors 89 and 92, the values of these resistances being so proportioned with respect to each other and to the resistor 93, that the voltage between conductors 74 and the junction point of the three resistors 92, 89 and 93 will be greater than the voltage change between conductors 74 and 76, so that the voltage variation in the grid circuit is greater than the voltage variation between conductors 76 and 99. Therefore, when a voltage between conductors 76 and 99 changes in either direction as above described, the potential change on the grid 68 is caused to be greater than it would otherwise by the action of the quick response network.

An anti-hunting influence is brought into the regulator action by the network 77, which upon a change in the exciter voltage applies a corresponding change in voltage across the resistor 83. The changing potential across resistor 83 causes a current to flow to or from the condenser 85 through the resistor 86 to introduce into the grid control circuit a voltage component that opposes the change in grid voltage causing the regulator action. For example, when the grid 68 has been made more negative by the regulator action to increase the excitation of the exciter field winding 14, this increase in potential causes charging current to flow downwardly through resistor 86, so that the upper end of the resistor 86 is more positive than the lower end to increase the potential of the grid 68 to provide the necessary anti-hunting action.

It will be seen, therefore, that a decrease in the motor speed below the critical value renders the phototube 24 more conductive, making conductor 76 and the grid 68 of the control tube 31 more negative to cause a smaller value of current to flow through the tube 31. The reduced voltage drop across the resistor 58 causes the grids 63 to become less negative to permit a greater value of current to flow through the tubes 32, 33 and 34 to increase the energization of the exciter field winding 14 and cause the motor speed to increase. Similarly, as the motor speed drops below its critical or desired value, the phototube 24 is made less conductive, thus increasing the potential on the grid 68 and causing the control tube 31 to pass more current and the rectifier tubes 32, 33 and 34 to pass less current to decrease the excitation of the exciter generator field winding 14 to correspondingly decrease the speed of the motor 1.

If desired, the speed responsive element of the regulator may correspond to that shown in Figs. 5 and 6, in which the two vertical tube sections 26 and 27 contain a single liquid, the level of which interrupts the beam of light from the source 19 to the tube 24 when above the level of the light beam and permits light to flow when the level of the fluid is below the level of the light beam. In this case, the connection of the terminals of the tube 24 will be reversed from that shown in Fig. 1, and the potential of the light source conductors 95 and 94 will also be reversed in order to produce the correct direction of voltage change between conductors 76 and 99, as the liquid in the tube rises above and below the level of the light beam.

It will be noted that the portion of the tube 103 containing an appreciable volume of fluid such as mercury, is in a direction extending substantially circumferentially of the axis of rotation, so that a change in the rate of speed of rotation of the tube about its axis causes flow of liquid, thus making the device responsive to changes in acceleration as well as to changes in speed. If, for example, the speed responsive devices are revolved in a counter-clockwise direction, as shown in Figs. 5 and 2, an increase in the rate of speed will cause more fluid to flow into the tube 26 from the tube 27 due to the inertia of acceleration than would flow from centrifugal force alone. This causes the level of the liquid in the tube 27 to fall below the level of the light beam from the source 19 to the phototube 24 before the completion of a speed correction, to thus introduce a stabilizing or anti-hunting action into the regulator. A deceleration in motor speed similarly creates a force of inertia causing fluid to flow from the tube 26 to the tube 27 to raise the tube level, this force being separate from the centrifugal force acting radially from the axis of rotation of the device. This inertia component of force causes the liquid in the vertical tube portion 27 to drop below the level of the light beam sooner than it would from centrifugal action alone, thus providing an anti-hunting influence. It will be appreciated, therefore, that the design of the speed responsive device is such that the liquid level is varied both in response to a change in motor speed, and also in response to motor acceleration or deceleration, in anticipation of a change in motor speed, thus making the device anticipate the changes in speed before the corrective action is completed. This anti-hunting influence may be sufficient that the anti-hunting network 77 is unnecessary and may be omitted.

Many modifications in the apparatus and circuits illustrated and described may be made within the spirit of my invention, and I do not wish to be limited otherwise than by the scope of the appended claims.

I claim as my invention:

1. In a speed responsive device for a regulator system, a tubular container having two vertical leg portions and a connecting portion containing a liquid mounted to revolve about an axis that is substantially coincident with one of said vertical leg portions, the portion of said tube connecting said two vertical portions extending radially and circumferentially with respect to the axis of rotation, a phototube and a source of illumination therefor arranged to illuminate said phototube as controlled by the level of the liquid in said axially located leg portion, and circuit means responsive to the control of said phototube.

2. In a speed indicating device for indicating a selected speed value, a tubular container having two vertical leg portions and a connecting portion mounted to revolve about an axis that is substantially coincident with one of said vertical leg portions, a liquid of relatively high specific gravity in the body of said container and a liquid of relatively light specific gravity in the axially disposed leg thereof above the first-named liquid, the container including a chamber of appreciable volume adjacent the juncture of said axially located leg and said connecting portion, a phototube and a source of illumination therefor arranged to illuminate said phototube as controlled by the level of the liquid in said axially located leg portion, and circuit means responsive to the control of said phototube.

3. In a speed responsive device for a regulator system, a tubular container having two vertical leg portions and a connecting portion containing a liquid mounted to revolve about an axis that is substantially coincident with one of said vertical leg portions, the other of said leg portions being of greater diameter than the axially located leg portions, a liquid of relatively high specific gravity in the body of said container and a liquid of relatively light specific gravity in the axially disposed leg thereof above the first-named liquid, the container including a chamber of appreciable volume between the axially located leg portion and the connecting portion, the portion of said tube connecting said two vertical portions extending radially and circumferentially with respect to the axis of rotation, a phototube and a source of illumination therefor arranged to illuminate said phototube as controlled by the level of the liquid in said axially located leg portion, and circuit means responsive to the control of said phototube.

4. In a speed responsive device for a regulator system, a tubular container having two vertical leg portions and a connecting portion mounted to revolve about an axis that is substantially coincident with one of said vertical leg portions, the other of said leg portions being of greater diameter than the axially located leg portion, a liquid of relatively high specific gravity in the body of said container and a liquid of relatively light specific gravity in the axially disposed leg thereof above the first-named liquid, the container including a chamber of appreciable volume adjacent the juncture of said axially located leg portion and the connecting portion, a phototube and a source of illumination therefor arranged to illuminate said phototube as controlled by the level of the liquid in said axially located leg portion, and circuit means responsive to the control of said phototube.

5. In a speed indicating device for indicating a selected speed value, a tubular container having two vertical leg portions and a connecting portion mounted to revolve about an axis that is substantially coincident with one of said vertical leg portions, the portion of said tube connecting said two vertical portions extending radially and circumferentially with respect to the axis of rotation, a liquid of relatively high specific gravity in the body of said container and a liquid of relatively light specific gravity in the axially disposed leg thereof above the first-named liquid, a phototube and a source of illumination therefor arranged to illuminate said phototube as controlled by the level of the liquid having relatively light specific gravity, and circuit means responsive to the control of said phototube.

6. In a speed responsive device for a regulator system, a tubular container having two vertical leg portions and a connecting portion containing a liquid mounted to revolve about an axis that is substantially coincident with one of said vertical leg portions, the portion of said tube connecting said two vertical portions extending radially and circumferentially with respect to the axle of rotation, the area of said container adjacent the juncture of said axially located leg and said connecting portion having an enlarged cross-section, a phototube and a source of illumination therefor arranged to illuminate said phototube as controlled by the level of the liquid in said axially located leg portion, and circuit means responsive to the control of said phototube.

7. In a speed responsive device for a regulator system, a tubular container having two vertical leg portions and a connecting portion containing a liquid mounted to revolve about an axis that is substantially coincident with one of said vertical leg portions, the other of said leg portions being of greater diameter than the axially located leg portion, the portion of said tube connecting said two vertical portions extending radially and circumferentially with respect to the axis of rotation, a liquid of relatively high specific gravity in the body of said container and a liquid of relatively light specific gravity in the axially disposed leg thereof above the first-named liquid, a phototube and a source of illumination therefor arranged to illuminate said phototube as controlled by the level of the liquid having relatively light specific gravity, and circuit means responsive to the control of said phototube.

8. In a speed responsive device for a regulator system, a tubular container having two vertical leg portions and a connecting portion containing a liquid mounted to revolve about an axis that is substantially coincident with one of said vertical leg portions, the portion of said tube connecting said two vertical portions extending radially and circumferentially with respect to the axis of rotation, the area of said container adjacent the juncture of said axially located leg and said connecting portion having an enlarged cross-section, a liquid of relatively high specific gravity in the body of said container and a liquid of relatively light specific gravity in the axially disposed leg thereof above the first-named liquid, a phototube and a source of illumination therefor arranged to illuminate said phototube as controlled by the level of the liquid having relatively light specific gravity, and circuit means responsive to the control of said phototube.

9. In a speed responsive device for a regulator system, a tubular container having two vertical leg portions and a connecting portion containing a liquid mounted to revolve about an axis that is substantially coincident with one of said vertical leg portions, the other of said leg portions being of greater diameter than the axially located leg portion, the portion of said tube connecting said two vertical portions extending radially and circumferentially with respect to the axis of rotation, the area of said container adjacent the juncture of said axially located leg and said connecting portion having an enlarged cross-section, a liquid of relatively high specific gravity in the body of said container and a liquid of relatively light specific gravity in the axially disposed leg thereof above the first-named liquid, a phototube and a source of illumination therefor arranged to illuminate said phototube as controlled by the level of the liquid having relatively light specific gravity, and circuit means responsive to the control of said phototube.

FINN H. GULLIKSEN.